United States Patent
Redgrave et al.

[11] Patent Number: 6,135,495
[45] Date of Patent: Oct. 24, 2000

[54] MOTOR VEHICLE AND A MOTOR VEHICLE AIRBAG MODULE

[75] Inventors: Ian Martin Redgrave, Daventry; Jonathan Peter Mabey, Woodford Halse, both of United Kingdom

[73] Assignee: Rover Group Limited, Warwick, United Kingdom

[21] Appl. No.: 09/195,537

[22] Filed: Nov. 19, 1998

[30] Foreign Application Priority Data

Dec. 10, 1997 [GB] United Kingdom ............... 9726108

[51] Int. Cl.$^7$ .................................................. B60R 21/16
[52] U.S. Cl. ........................................ 280/732; 280/752
[58] Field of Search ........................... 280/728.1, 728.2, 280/728.3, 732, 751, 752, 748

[56] References Cited

U.S. PATENT DOCUMENTS

| | | | |
|---|---|---|---|
| 5,145,207 | 9/1992 | Berderka et al. | 280/728.2 |
| 5,310,213 | 5/1994 | Mori | 280/728.2 |
| 5,431,442 | 7/1995 | Tomita et al. | 280/752 |
| 5,505,484 | 4/1996 | Miles et al. | 280/728.2 |
| 5,533,747 | 7/1996 | Rose . | |
| 5,544,912 | 8/1996 | Sommer | 280/728.3 |
| 6,010,147 | 1/2000 | Brown | 280/728.2 |

FOREIGN PATENT DOCUMENTS

0823353A1  7/1997  European Pat. Off. .

*Primary Examiner*—Paul N. Dickson
*Assistant Examiner*—Faye M. Fleming
*Attorney, Agent, or Firm*—Davis and Bujold

[57] ABSTRACT

An airbag module 20 is described having side walls 28, 29 which are weakened by being out of plane so that upon contact from a knee bolster 17 they collapse in a controlled manner.

13 Claims, 4 Drawing Sheets

MOTOR VEHICLE AND A MOTOR VEHICLE AIRBAG MODULE

FIELD OF THE PRESENT INVENTION

This invention relates to motor vehicles and in particular to an airbag module or a motor vehicle.

BACKGROUND OF THE PRESENT INVENTION

It is well know to provide an airbag module for a motor vehicle having a container for storing an airbag and an inflation means for the airbag. It is a problem with such prior art airbag modules that the container is a rigid member that is not easily deformed.

This can be a disadvantage in a severe impact if the legs of an occupant of the vehicle contact a knee bolster assembly provided to protect the legs against injury and cause it to be pushed into contact with the container. This is because contact of the knee bolster against the rigid container will produce a sudden increase in the load acting against the legs of the passenger.

It is an object of this invention to provide an improved airbag module.

BRIEF SUMMARY OF THE PRESENT INVENTION

According to a first aspect of the invention there is provided a motor vehicle airbag module for housing an airbag and an inflation means, the module comprising an open ended container defined by a top plate for attaching the module to a structural part of a motor vehicle, a bottom plate, two side walls and a rear wall, the top plate, bottom plate and side walls having front edges defining an aperture through which in use an airbag can be deployed wherein the side walls are non-planar members such that upon the application of a impact force beyond a predetermined magnitude to the bottom plate the side wall members buckle in a controlled manner thereby allowing the bottom plate to move towards the top plate.

Preferably, each side wall has at least one corrugation therein extending from or near the aperture towards the rear wall.

The top plate may have a pair of upstanding flanges attached thereto used to attach the module to a structural part of a motor vehicle in which case the top plate may be stiffened in the region of the flanges to provide a rigid fixing means for the module.

Advantageously, the bottom plate may have a stiffening rib extending parallel and near to the front edge thereof.

Advantageously, each side wall may have a cut-out therein near to its juncture with the rear wall extending from the bottom plate to a position near to the end of a corrugation so as to form a deformable portion of bottom plate near to its juncture with the rear wall.

According to a second aspect of the invention there is provided a motor vehicle having a body structure defining an engine compartment and a passenger compartment separated by a firewall, a first structural member connected to the firewall near to an upper edge on the passenger compartment side of the firewall, a second structural member extending between opposite sides of the motor vehicle on the passenger compartment side of the firewall, a knee bolster connected to said second structural member for controlled collapse in the event of an impact above a pre-determined force and an airbag module housing an airbag and an inflation means, the module comprising an open ended container defined by a top plate for attaching the module to said first structural member, a bottom plate, two side walls and a rear wall, the top plate, bottom plate and side walls having front edges defining an aperture through which the airbag can be deployed, wherein the side walls are non-planar members such that upon contact between the knee bolster and the bottom plate, the side wall members buckle in a controlled manner thereby allowing the bottom plate to move towards the top plate.

BRIEF DESCRIPTION OF THE DRAWINGS

The invention will now be described by way of example with reference to the accompanying drawing in which.

DESCRIPTION OF THE PRESENT INVENTION

Figure 1:
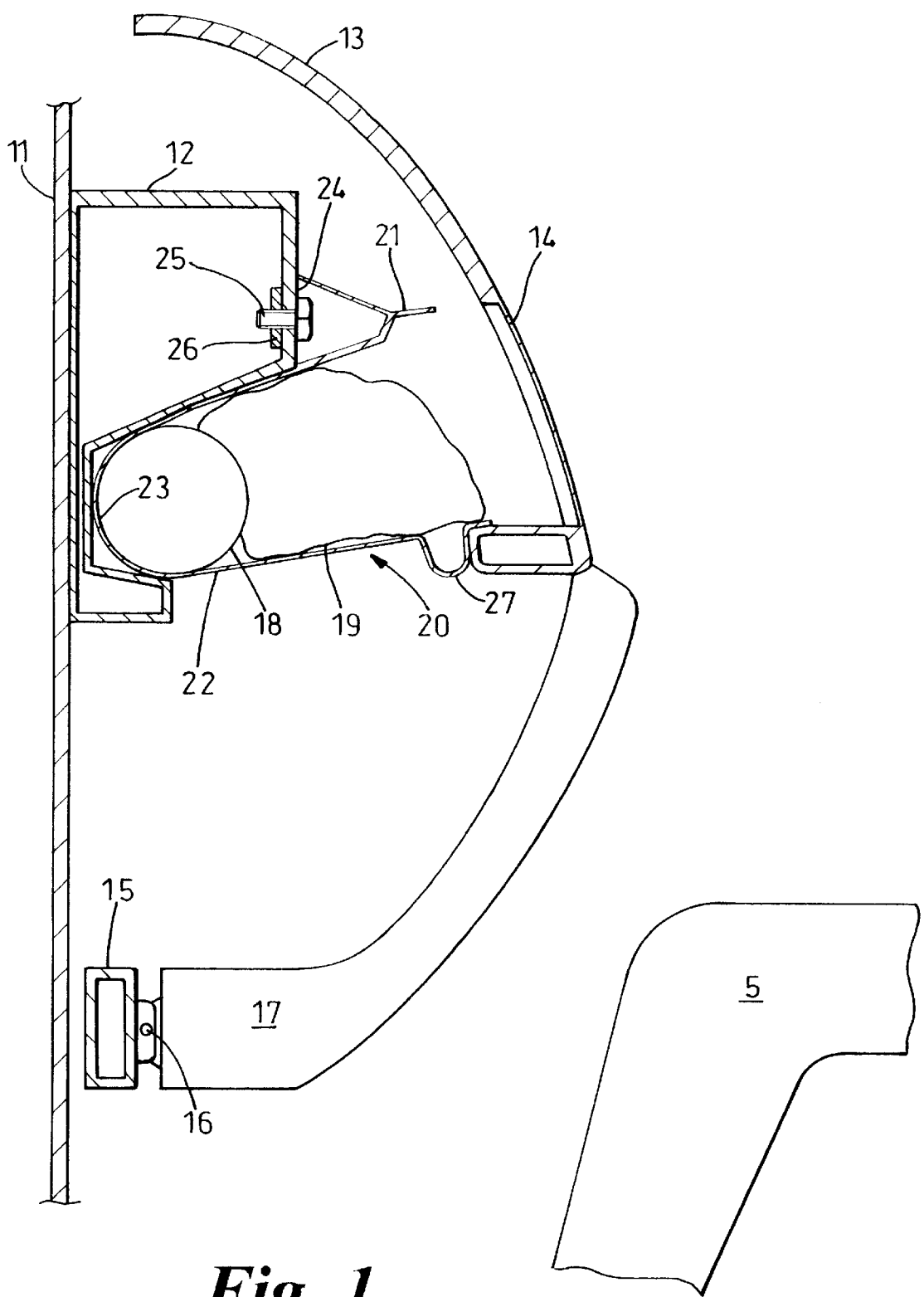
FIG. 1 is a cross-section through a motor vehicle and airbag module according to the invention in a normal use condition.

A motor vehicle (not shown) has a body structure defining an engine compartment and a passenger compartment separated by a firewall 11. A first structural member in the form of a light alloy box section beam 12 is connected to the firewall 11 near to an upper edge of the firewall 11 on the passenger compartment side of the firewall 11. A second structural member in the form of a cross car beam 15 extends between opposite sides of the motor vehicle where it is connected to 'A' posts (not shown) forming part of the structure of the motor vehicle.

The first structural member 12 is used to provide a strong support means for an airbag module 20 and a fascia member 13. The fascia member 13 has a weakened portion 14 through which an airbag 19 can force its way through during deployment.

The airbag module 20 comprises of a top plate 21, a bottom plate 22, a rear wall 23 and two side walls 28 and 29 which in combination define an open ended container. The top plate, bottom plate and side walls have front edges 21*f*, 22*f*, 28*f* and 29*f* which define an aperture or mouth through which, in use, the airbag 19 can be deployed.

An airbag inflation means 18 is mounted within the airbag module 20 and is attached to the airbag 19 so as to provide a means for inflating the airbag 19 when required.

The airbag module 20 is connected to the first structural member 12 by means of a pair of spaced apart bolts 25 each of which extends through a respective aperture in an upstanding flange 24 connected to the top plate 21. Each of the bolts is engageable with a respective nut 26 held captive on the inside of the first structural member 12. The top plate 21 is stiffened in the region of the flanges 24 by means of webs 24*b* which ensure that the flanges 24 are securely connected to the top plate 21. Each of the side plates 28, 29 is non-planar having a weakening corrugation 32 extending from the front edges 28*f* and 29*f* of the side walls 28 and 29 to a position near to the rear wall 23. At the end of each corrugation there is formed a cut-out 33, 34 in the respective side wall 28, 29 so as to provide a relatively easy to deform section 35 in the bottom plate 22.

Near to its front edge 22f the bottom plate 22 has a strengthening rib 27 formed therein. The strengthening rib 27 extends for substantially the entire distance between the two side walls and provides a very rigid structure in the region of the front edge 22f of the bottom plate 22.

During normal use the airbag module 20 is positioned, as shown in FIG. 1, with the airbag 19 stored within the container in an uninflated state. When the vehicle is involved in a collision the airbag 19 is activated by accelerometer means (not shown) causing the airbag inflation means 18 to be activated thereby filling the airbag 19 with gas. If the collision is severe it is likely that part of the lower leg structure 5 of one of the occupants of the motor vehicle will contact a knee bolster in the form of a glovebox lid 17. The glovebox lid 17 is pivotally connected by means of a pivot 16 to the cross car beam 15. The object of the knee bolster 17 is to cushion the impact of an occupant's lower leg 5 should it come into contact with part of the motor vehicle. If the collision is particularly severe the knee bolster 17 will contact the lower plate 22 in the region of its front edge 22f. Because of the presence of the transverse rib 27 the bottom plate 22 is relatively rigid in this region and therefore is forced upwardly by the impact force applied from the knee bolster 17. The non-planar nature of the side walls 28 and 29 and the presence of the cut-outs 33 and 34 results in the corrugations 32 being buckled or distorted by the application of this load to the bottom plate 22. This causes the bottom plate 22 to bend upwardly along a transverse bend line 30 located within the weakened portion 35 thereby allowing it to move towards the top plate 21. The force required to buckle the corrugations 32 and bend the bottom plate 22 along the bend line 30 is relatively low and therefore the load transferred through the knee bolster 17 to the lower leg structure 5 of an occupant is relatively low.

Figure 2:
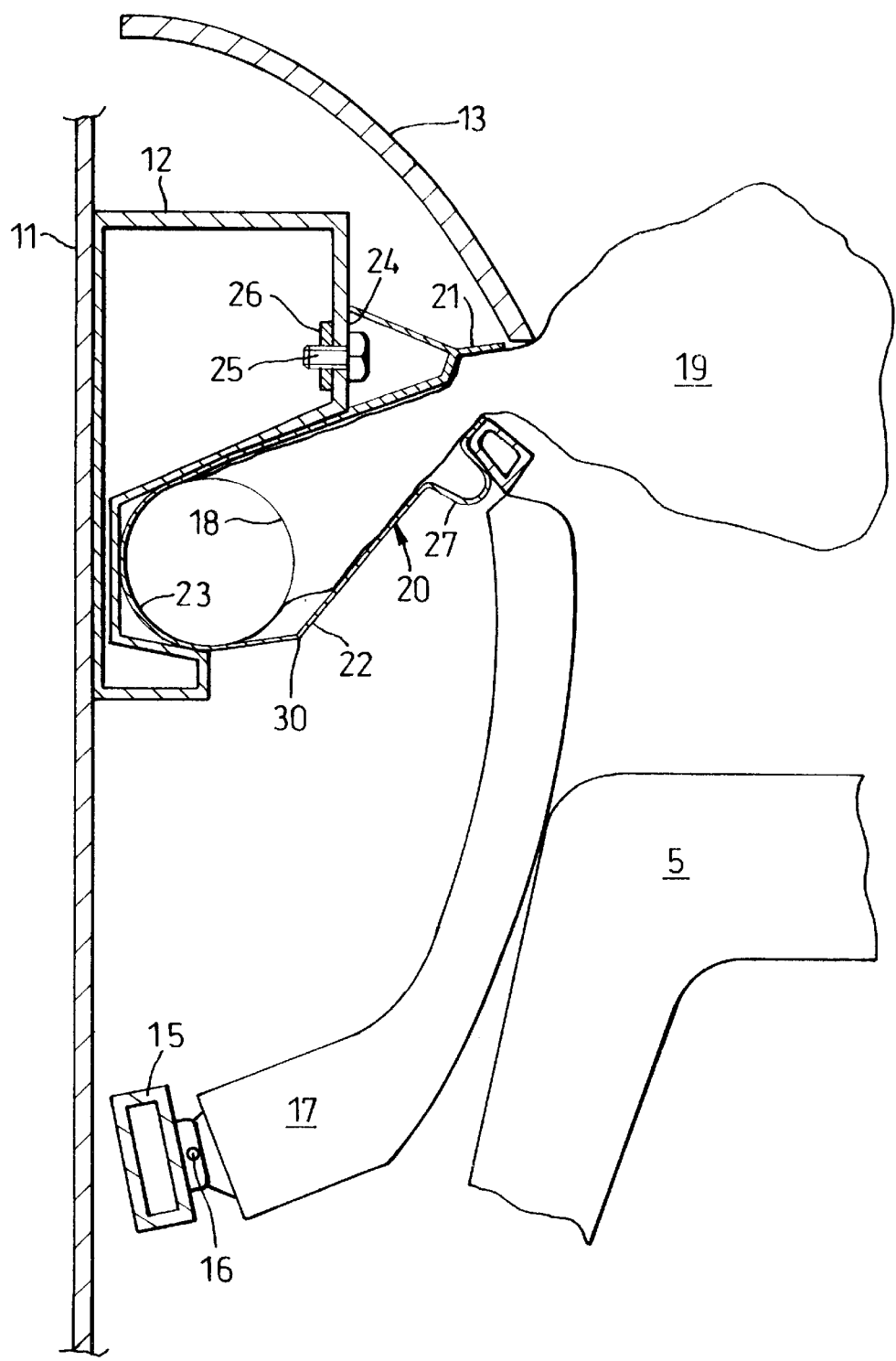
FIG. 2 is a cross-section as shown in FIG. 1 but showing the effect of an impact of a knee bolster against the airbag module.

At the end of a severe collision the knee bolster 17 occupies the position shown in FIG. 2 having pushed the bottom plate 22 upwardly towards the top plate 21. However the airbag 19 is not unduly affected by this upward movement of the bottom plate 22 and is still able to perform its role in protecting the upper torso and head of an occupant efficiently.

By varying the length and offset of the "Z" shaped corrugations 32 the magnitude of the force needed to buckle the side walls 28 and 29 can be adjusted so as to provide a controlled collapse of the side walls 28 and 29.

Figure 3:
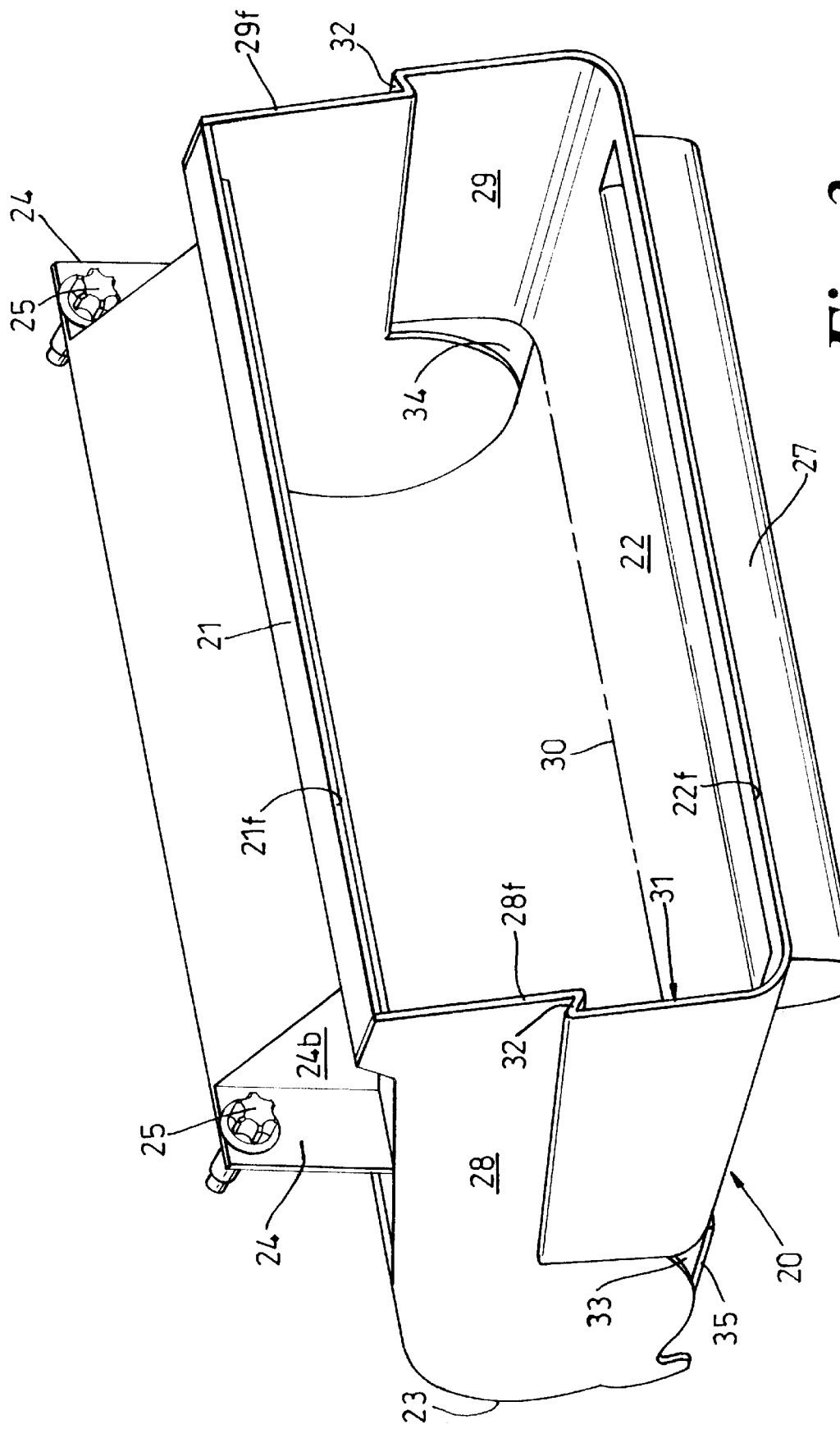
FIG. 3 is a pictorial view of an air bag module container in a normal condition.
Figure 4:
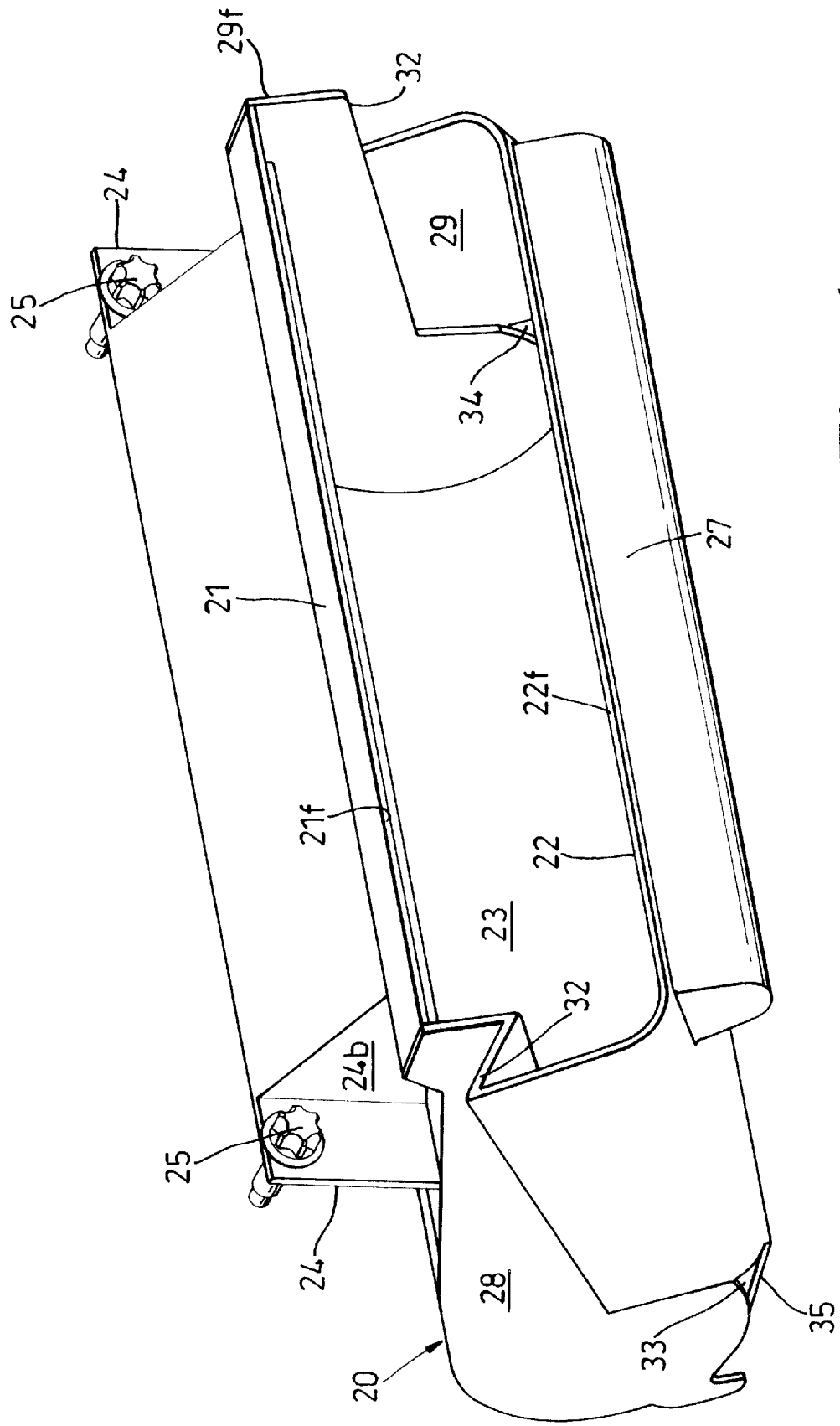
FIG. 4 is a pictorial view of the airbag module container of FIG. 3 showing the effect of an impact upon the container.

The presence of the transverse strengthening rib 27 performs a useful role in that it prevents random bending or distortion of the lower plate 22 which would make it very much more difficult to control the collapse of the side walls 28 and 29. As shown in FIGS. 3 and 4 the top plate 21, bottom plate 22, rear wall 23 and side walls 28 are all formed from a single piece of material that is bent to shape from a single piece of sheet metal material. However it will be appreciated that all of these parts could be made separately and joined together or various combinations of the parts could be constructed to provide an airbag module with the correct properties.

Although the invention has been described in relation to a specific embodiment in which the side walls are out of plane by the presence of corrugations other means of producing an out of plane side wall are envisaged. For example the side wall could be bent along a front to rear axis so as to be out of plane. The object of producing an out of plane structure is that such a structure will buckle more readily when a compressive load is applied to it that a planar element that tends to act as a strut.

What is claimed is:

1. A motor vehicle airbag module for housing an airbag and an inflation means, the airbag module comprising an open ended container defined by a top plate for attaching the airbag module to a structural part of a motor vehicle, a bottom plate, two side walls and a rear wall, the top plate, bottom plate and side walls having front edges defining an aperture through which, in use, an airbag can be deployed, wherein the side walls are each weakened by having a non-planar discontinuity such that upon application of an impact force beyond a predetermined magnitude to the bottom plate the discontinuities of the non-planar side walls buckle in a controlled manner thereby allowing the bottom plate to move toward the top plate and partially compress the airbag module without preventing deployment of the airbag.

2. The module as claimed in claim 1 wherein each said side wall has at least one corrugation therein extending from or near the aperture towards the rear wall.

3. The module as claimed in claim 1 wherein the top plate has a pair of upstanding flanges attached thereto which are used to attach the airbag module to a structural part of a motor vehicle.

4. The module as claimed in claim 3 wherein the top plate is stiffened in a region of the pair of upstanding flanges to provide a rigid fixing means for the airbag module.

5. The module as claimed in claim 1 wherein the bottom plate has a stiffening rib extending parallel and near the front edge thereof.

6. The module as claimed in claim 1 wherein each side wall has a cut out therein near to a juncture of the side wall with the rear wall extending from the bottom plate to a position near to the end of a corrugation so as to form a deformable portion of the bottom plate near to a juncture of the bottom wall with the rear wall.

7. A motor vehicle having a body structure defining an engine compartment and a passenger compartment separated by a firewall, a first structural member connected to the firewall near to an upper edge on the passenger compartment side of the firewall, a second structural member extending between opposite sides of the motor vehicle on the passenger compartment side of the firewall, a knee bolster connected to said second structural member for controlled collapse in the event of an impact above a pre-determined force and an airbag module housing an airbag and an inflation means therein, the airbag module comprising an open ended container defined by a top plate for attaching the airbag module to said first structural member, a bottom plate, two side walls and a rear wall, the top plate, bottom plate and side walls having front edges defining an aperture through which the airbag can be deployed, wherein the side walls each have a non-planar discontinuity such that upon contact between the knee bolster and the bottom plate, the discontinuities of the non-planar side walls buckle in a controlled manner thereby allowing the bottom plate to move toward the top plate and partially compress the airbag module without preventing deployment of the airbag.

8. A motor vehicle airbag module for housing an airbag and an inflation device, the airbag module comprising an open ended container defined by a top plate for attaching the airbag module to a structural part of a motor vehicle, a bottom plate, two side walls and a rear wall, the top plate, bottom plate and side walls having front edges defining an aperture through which, in use, an airbag can be deployed, wherein each side wall is an integral side wall which is weakened by a corrugation so as to be a non-planar side wall such that upon the application of an impact force to the bottom plate, beyond a predetermined magnitude, the bottom plate moves toward the top plate and the corrugation of both of the side walls buckle in a controlled manner thereby allowing the bottom plate to move toward the top plate and partially compress the airbag module without preventing deployment of the airbag whereby each of the side walls remains an integral side wall even following compression of the airbag module.

9. The module as claimed in claim 8 wherein the corrugation of each side wall is Z-shaped and extends from adjacent the aperture toward the rear wall.

10. The module as claimed in claim 8 wherein the top plate has a pair of upstanding flanges attached thereto which are used to attach the airbag module to a structural part of a motor vehicle.

11. The module as claimed in claim 10 wherein the top plate is stiffened in a region of the pair of flanges to provide a rigid fixing mechanism for the airbag module.

12. The module as claimed in claim 8 wherein the bottom plate has a stiffening rib extending parallel and adjacent the front edge thereof.

13. The module as claimed in claim 8 wherein each side wall has a cut out therein, near a juncture of the side wall with the rear wall, extending from the bottom plate to a position near to an end of the corrugation so as to form a deformable portion of the bottom plate, near a juncture of the bottom wall with the rear wall.

* * * * *